(12) United States Patent
Howard et al.

(10) Patent No.: US 7,814,274 B2
(45) Date of Patent: Oct. 12, 2010

(54) METHOD AND SYSTEM FOR DYNAMIC BINDING IN A STORAGE AREA NETWORK

(75) Inventors: Michael T. Howard, Andover, MA (US); Jared M. Oberhaus, Palo Alto, CA (US); Evan Bigall, New York, NY (US); Lawrence Stein, San Carlos, CA (US)

(73) Assignee: Scalent Systems, Inc., Palo Alto, CA (US)

( * ) Notice: Subject to any disclaimer, the term of this patent is extended or adjusted under 35 U.S.C. 154(b) by 507 days.

(21) Appl. No.: 11/655,477

(22) Filed: Jan. 19, 2007

(65) Prior Publication Data

US 2008/0177871 A1 Jul. 24, 2008

(51) Int. Cl.
*G06F 12/00* (2006.01)
(52) U.S. Cl. ...................................................... 711/114
(58) Field of Classification Search ........................ None
See application file for complete search history.

(56) References Cited

U.S. PATENT DOCUMENTS

| | | | | |
|---|---|---|---|---|
| 7,127,602 B1 * | 10/2006 | Bakke et al. ................... 713/2 |
| 7,334,027 B2 * | 2/2008 | Nakajima et al. ............ 709/221 |
| 7,356,685 B2 * | 4/2008 | Backman ........................ 713/2 |
| 7,363,356 B1 * | 4/2008 | Rissmeyer et al. ........... 709/220 |
| 7,469,281 B2 * | 12/2008 | Kaneda et al. ............... 709/223 |
| 7,583,681 B2 * | 9/2009 | Green .......................... 370/401 |
| 2006/0041656 A1 | 2/2006 | Li et al. |
| 2006/0112219 A1 | 5/2006 | Chawla et al. |
| 2009/0271432 A1 * | 10/2009 | Shankar et al. .............. 707/102 |

* cited by examiner

*Primary Examiner*—Duc T Doan
(74) *Attorney, Agent, or Firm*—William L. Botjer

(57) ABSTRACT

A system, method and computer program product for dynamically binding a server to a remote disk in a data center is provided. In a data center, servers and storage devices that manage multiple remote disks communicate over a switched fabric by using a standard protocol suite. The servers, storage devices and the switched fabric constitute a Storage Area Network (SAN). The devices present on the SAN are assigned a virtual identity, independent of their physical identity. The virtual identity of the servers facilitates the dynamic instantiation of the server images located on multiple remote disks on the servers.

58 Claims, 9 Drawing Sheets

METHOD AND SYSTEM FOR DYNAMIC BINDING IN A STORAGE AREA NETWORK

BACKGROUND

The invention generally relates to remote booting in a Storage Area Network (SAN). More specifically, the invention relates to a method and system for dynamically binding a server to a remote disk in a SAN.

A SAN is a network that interconnects servers and storage devices and enables high-speed transfer of data between them. Each storage device includes multiple remote disks. Each remote disk stores several server images. A server image is a combination of an operating system, the operating system configuration data, the application software, and the application configuration data, together with the SAN-related configurations. Further, each storage device includes a storage controller. The storage controller manages the multiple remote disks and provides services such as RAID, read cache, write cache, Flash Copy, Peer-to-Peer Copy, and the like. The storage controller can enforce a one-to-one mapping between a server and a remote disk, which ensures that multiple servers do not access the remote disk concurrently. This helps to prevent data corruption. The SAN also includes a communication infrastructure that physically connects the servers to the storage devices. The communication infrastructure manages the data transfer between the servers and the storage devices by using a standard protocol.

The Fibre Channel SAN (FC-SAN) with the Small Computer System Interface (SCSI) standard is one of the most common SAN technologies. There are three major topologies for the FC-SAN, i.e., Point-to-Pont (FC-P2P), Arbitrated Loop (FC-AL) and Switched Fabric. The switched fabric comprises a number of Fibre Channel switches (Director switches or Fabric switches). These switches provide optimal interconnection between the servers and the storage devices. The servers and storage devices connect to the switched fabric through a Fibre Channel Host Bus Adapter (HBA). Each HBA has a factory-installed World Wide Name (WWN), which is universally unique. The WWN facilitates communication between a server and a storage device.

In SCSI terminology, communication occurs between an initiator and a target. A server, acting as the initiator, sends a request to the storage controller for a desired block or data segment stored on a remote disk that is referred to as the target.

Further, in FC-SW topology, the switched fabric is partitioned into smaller groups to prevent interference, provide strict security, and ease its overall management. This partitioning is known as zoning. Zoning controls access to the remote disks and manages visibility in the SAN, thereby avoiding unauthorized access to the remote disks.

The existing method for remote booting a server from a remote disk in a SAN includes recording a factory-assigned WWN of an HBA installed on the server. Further, the remote disk, containing a desired server image, is identified and the corresponding storage device is configured to provide access to the server. Subsequently, the firmware on the HBA of the server is configured for remote booting from the remote disk assigned to the server. Furthermore, the switched fabric is configured to authorize the server to connect to the remote disk. These configuration settings are persistent until explicitly modified by a data center administrator.

If an HBA that is installed on the server fails and a replacement HBA is installed, or server hardware failure occurs and the server is replaced with a back-up server with a different HBA, booting the server is not possible without appropriate configuration changes made by the data-center administrator. However, these changes require manual, multi-step operator intervention and are error-prone. Moreover, it may result in data corruption and interruption in the data center service.

In present-day data centers, server repurposing is a common requirement. This involves a change in software, which includes an operating system and a set of applications running on the server. Therefore, the server is required to boot from a different remote disk. It is desirable to have dynamic control over the number of servers deployed in the functional tiers of a business system, so that the capacity of the business system can be dynamically adjusted to meet variable demands. In the state of the art, servers have a pre-determined function and configuration, as well as provision for anticipated maximal utilization. This results in inefficient utilization of network resources and an increase in overall maintenance and operational costs.

There exist methods in the prior art that facilitate the process of changing the persistent binding between the servers and the remote disks. One such technique, known as WWN spoofing or aliasing, enables an HBA of the server to assume a WWN other than the one installed on the hardware of the server. In the event of server hardware failure and a replacement server being brought in, the data center administrator assigns the WWN of the old HBA to the HBA of the replacement server. However, this method does not allow the same server to boot from or access-different remote disks at different times without operator intervention before each such change.

Another technique, known as N_Port ID Virtualization (NPIV), allows a server's HBA to assume multiple, non-persistent WWNs and access multiple remote disks by using different WWNs. NPIV enables an HBA port to serve as multiple logical ports, each with its own unique identity. A port login process involves the HBA port making a request for multiple IDs from attached SAN communication devices. Thereby, multiple logical ports with a unique World Wide Port and Node Names are created. The binding between the logical ports and the remote disks is preserved, even after a server function is moved to a new machine. However, the initialization of the HBA with additional WWNs can occur only after the server has a loaded operating system and an HBA driver is operational. Thus, this technique cannot be used for dynamic binding between a server and the remote disk, which contains a desired server image for booting.

In light of the above, there is a need for a method and system that facilitates dynamic non-persistent binding between a server and a remote disk. Moreover, there is a need for a method and system that enables non-persistent binding without necessitating any permanent configuration changes on the server, the storage devices, and the communication devices present on the SAN.

SUMMARY

An object of the invention is to dynamically bind a server to a remote disk, for booting in a data center.

Another object of the invention is to facilitate a non-persistent binding between the server and the remote disk, for booting in the data center.

Yet another object of the invention is to non-persistently instantiate a virtual World Wide Name (WWN) on a server, for booting from a remote disk in the data center.

The invention provides a method, system and computer program product for dynamic, non-persistent binding of a server to a remote disk by using a virtual WWN.

The data center includes a plurality of servers and one or more storage devices. Each storage device manages one or more remote disks. The data center also comprises a switched fabric to connect the plurality of servers and the one or more storage devices. The servers, storage devices and the switched fabric constitute a Storage Area Network (SAN). The data center also comprises a boot controller to manage the remote booting of servers.

The boot controller dynamically selects a server image located on a remote disk, to boot on a server, based on the requirements of the data center. The boot controller assigns at least one virtual WWN to the remote disks. Further, the boot controller instantiates a virtual WWN on the server. Subsequently, the server boots from the desired server image by using the virtual WWN, which uniquely identifies the server, independent of the underlying hardware configuration. In another embodiment of the invention, a boot gateway, in conjunction with the boot controller, executes a staged booting of the server.

Therefore, the invention eliminates the use of persistent mappings and configurations to boot the server from the remote disk. The invention supports decoupling of the software environment and the configurations from the hardware of the server. Further, the invention facilitates the implementation of server repurposing in a data center.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION OF EMBODIMENTS

Various embodiments of the invention provide a system and method for dynamically binding servers to remote disks in a data center. In a data center, a server is assigned a virtual identity, which is independent of the physical identity of the server. Further, a server image is dissociated from the server hardware and the network-related attributes of the server. The server image is instantiated dynamically on any suitable server available in the data center by using the virtual identity of the server.

Figure 1:
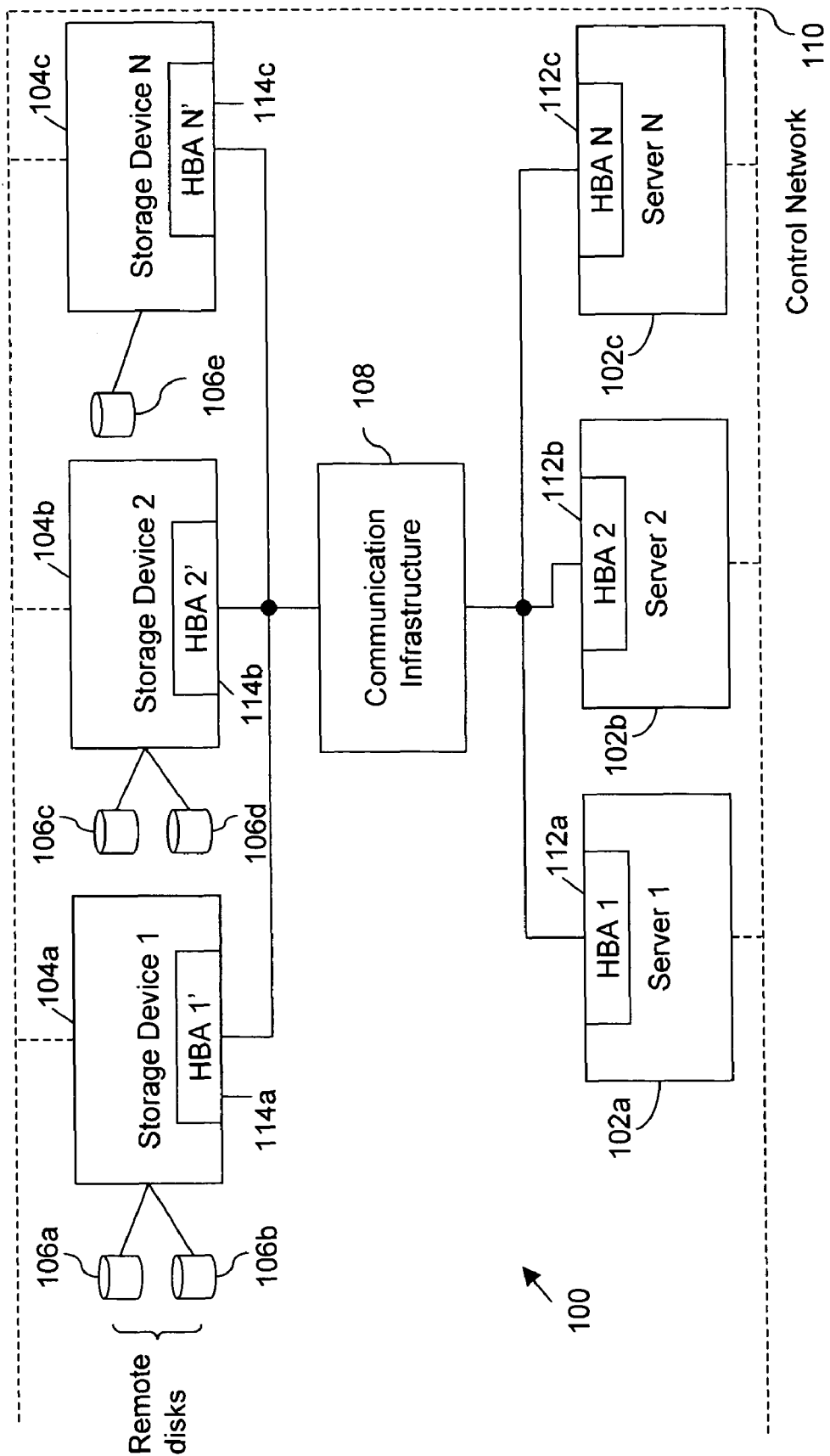
FIG. 1 is a block diagram illustrating a data center in which various embodiments of the invention may be practiced.

FIG. 1 is a block diagram illustrating a data center 100 in which various embodiments of the invention may be practiced. Data center 100 includes at least one server. For example, data center 100 includes a server 102a, a server 102b, and a server 102c, hereinafter referred to as servers 102. Further, data center 100 includes one or more storage devices, for example, a storage device 104a, a storage device 104b, and a storage device 104c, hereinafter referred to as storage devices 104. Each storage device 104 manages a plurality of remote disks. For example, storage device 104a manages a remote disk 106a and a remote disk 106b. Storage device 104 manages remote disk 106 through specialized equipment known as a storage controller (not shown in FIG. 1).

Data center 100 includes a communication infrastructure 108. Servers 102, storage devices 104 and communication infrastructure 108 constitute a SAN. Further, data center 100 includes a control network 110.

Each server 102 connects to communication infrastructure 108 through a Host Bus Adapter (HBA). For example, server 102a connects to communication infrastructure 108 through HBA 112a. Similarly, each storage device 104 connects to communication infrastructure 108 through an HBA. For example, storage device 104a connects to communication infrastructure 108 through HBA 114a.

Servers 102 may be required to boot from a server image located on one of remote disks 106, based on the functional requirements of data center 100. Server 102 communicates with storage device 104 managing remote disk 106, which contains the desired server image. Servers 102 and storage devices 104 exchange data over the communication infrastructure 108 by using pre-defined protocol suites. Control network 110 is a TCP/IP network with a pre-defined protocol suite. Servers 102 connect to control network 110 through Ethernet Network Interface Cards (NICs) (not shown in FIG. 1). Storage devices 104 also connect to control network 110. Further, each HBA 112 and HBA 114 is identified by a unique World Wide Name (WWN) that is factory-installed. These WWNs facilitate communication between servers 102 and storage devices 104.

In various embodiments of the invention, servers 102 may be standalone servers, virtual servers, web servers, virtual racks, chassis, and the like. Further, communication infrastructure 108 may be a Fibre Channel with Small Computer System Interface (SCSI) protocol suite, an Ethernet (TCP/IP) with an Internet Small Computer System Interface (iSCSI) protocol suite or Ethernet with Advanced Technology Attachment (ATA) protocol suite.

In various embodiments of the invention described henceforth, communication infrastructure 108 is a Fibre Channel Switched Fabric (FC-SW) with an SCSI protocol suite. Accordingly, communication infrastructure 108 will hereinafter be referred to as switched fabric 108. It should be recognized by persons ordinarily skilled in the art that various embodiments of the invention are equally applicable to other possible embodiments of communication infrastructure 108.

Figure 2:
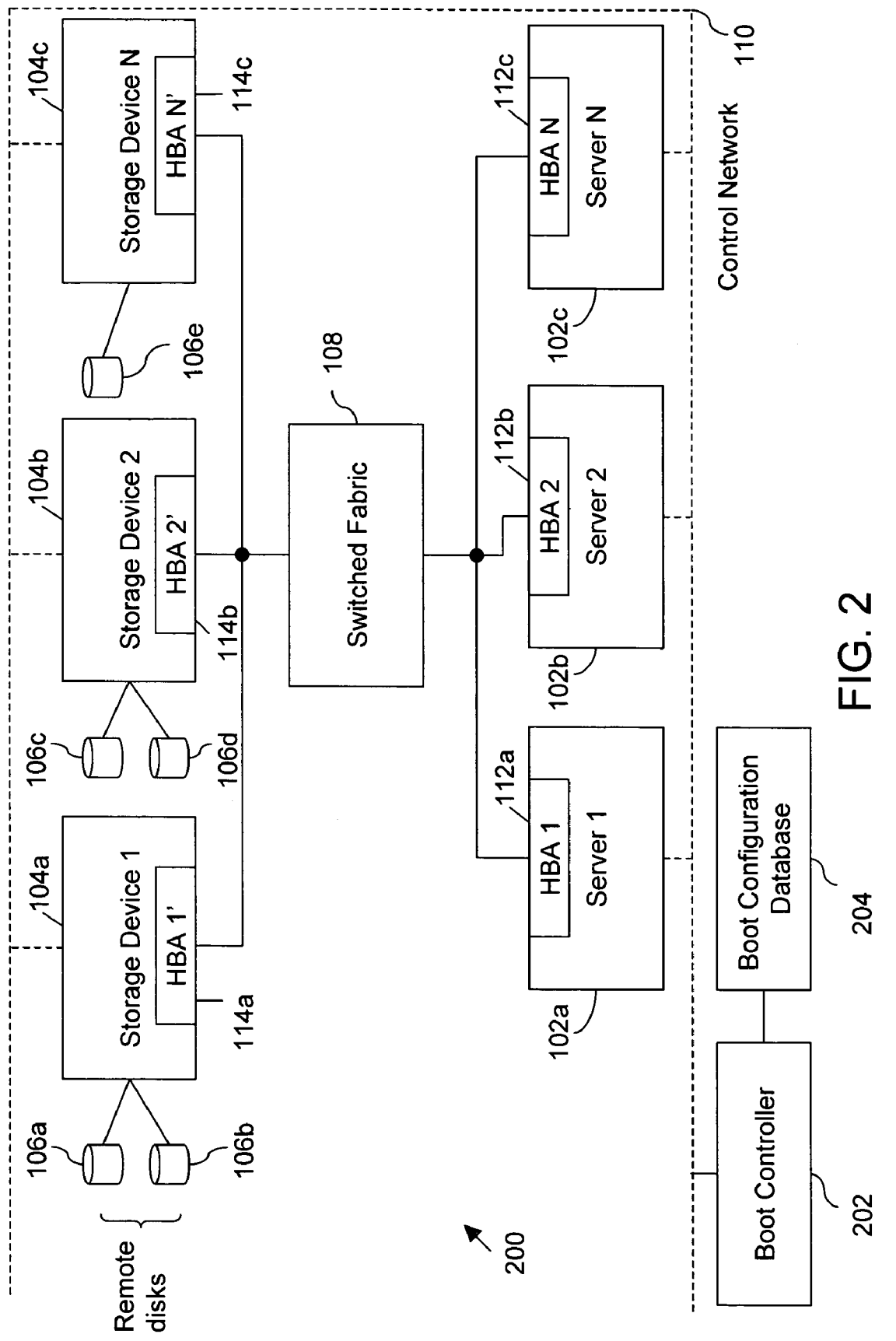
FIG. 2 is a block diagram illustrating the data center, in accordance with an embodiment of the invention.

FIG. 2 is a block diagram illustrating a data center 200, in accordance with an embodiment of the invention. Data center 200 includes servers 102 (known as 'initiators' in SCSI parlance). Data center 200 also includes one or more storage devices 104, which manage multiple remote disks 106. Servers 102 access remote disks 106 (known as 'targets' in SCSI parlance) over switched fabric 108 through HBA 112. Servers 102, storage devices 104 and switched fabric 108 constitute a SAN. Further, data center 200 includes a boot controller 202 and a boot configuration database 204.

Boot controller 202 is a specialized appliance or software operating on servers 102. Boot controller 202 and servers 102 communicate over control network 110. Boot controller 202 facilitates dynamic, non-persistent binding between a server 102 and a remote disk 106 by using a set of virtual WWNs.

Dynamic assignment of virtual WWNs to remote disk generally means that the configuration settings related to the assignment of virtual WWNs to remote disk 106 are done instantaneously by boot controller 202. Further, non-persistent binding between server 102 and remote disk 106 generally means that the configuration settings related to the binding of server 102 and remote disk-106 are temporary and are defined based on the functional requirements of data center 200. Virtual WWNs are universally unique names that identify the devices present on the SAN, independent of physical identity of the devices. The set of virtual WWNs and the set of factory-installed WWNs are mutually exclusive.

For example, boot controller 202 selects a first virtual WWN from the set of virtual WWNs and assigns it to storage device 104. Further, boot controller 202 selects one or more virtual WWNs from the set of virtual WWNs and assigns the one or more virtual WWNs to remote disk 106. In an embodiment of the invention, the assignment of virtual WWNs to remote disk 106 is a static assignment, which is persistent in nature, until explicitly modified. Static assignment of virtual WWNs to remote disk 106 generally means that the configuration settings related to the assignment of virtual WWNs to remote disk 106 are permanently or persistent in nature. In an embodiment of the invention, the static assignment may be performed by the data center administrator.

In another embodiment of the invention, the assignment of virtual WWNs to remote disk 106 is a dynamic assignment undertaken by boot controller 202 by using standard management Application Programming Interfaces (APIs), for example, Simple Network Management Protocol (SNMP). Dynamic assignment of virtual WWNs to remote disk generally means that the configuration settings related to the assignment of virtual WWNs to remote disk 106 are done instantaneously by boot controller 202. Further, boot controller 202 communicates information related to the assignment of virtual WWNs to remote disk 106 to storage device 104 over control network 110. In addition, virtual WWNs are also configured in switched fabric 108.

Thereafter, based on the functional requirements of data center 200, boot controller 202 selects remote disk 106, which contains a desired server image. Subsequently, boot controller 202 dynamically maps one of the one or more virtual WWNs, assigned to remote disk 106, to server 102.

Further, boot controller 202 manages boot configuration database 204. Boot configuration database 204 stores information related to the dynamic binding of server 102 with remote disk 106. The various modules of boot configuration database 204 are explained in conjunction with FIG. 3.

In various embodiments of the invention, one or more HBAs 112 may be present in servers 102. Further, one or more boot controllers 202 may be present in data center 200. However, only one boot controller 202 is provisioned to facilitate dynamic binding of server 102. Various redundant devices constituting switched fabric 108 may also be present in data center 200.

Figure 3:
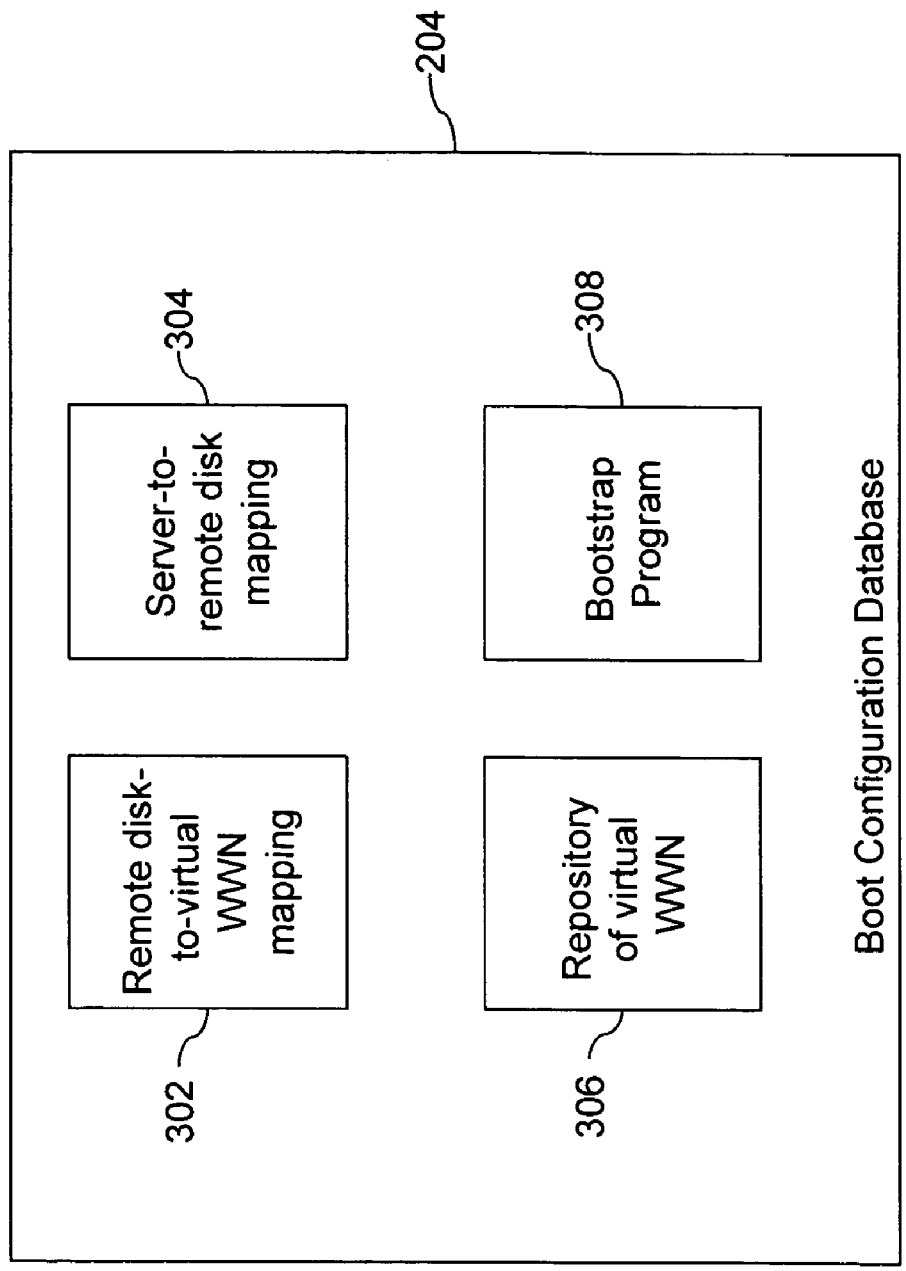
FIG. 3 is a block diagram illustrating a boot configuration database, in accordance with an embodiment of the invention.

FIG. 3 is a block diagram illustrating a boot configuration database 204, in accordance with an embodiment of the invention. Boot configuration database 204 includes a remote disk-to-virtual WWN mapping 302, a server-to-remote disk mapping 304, a repository of virtual WWNs 306, and a bootstrap program 308. Remote disk-to-virtual WWN mapping 302 defines one or more virtual WWNs assigned to remote disk 106, authorizing only initiators with these virtual WWNs to access remote disk 106. Remote disk-to-virtual WWN mapping 302 is updated by boot controller 202.

Further, server-to-remote disk mapping 304 defines server 102 as authorized to access remote disk 106. This facilitates one-to-one association between server 102 and remote disk 106. Server-to-remote disk mapping 304 is dynamically updated by boot controller 202. In an embodiment of the invention, server-to-remote disk mapping 304 prevents the concurrent access of servers 102 to remote disks 106.

Further, boot configuration database 204 includes repository 306 that contains a pool of virtual WWNs. Repository 306 contains virtual WWNs that may be mapped uniquely to a device connected to switched fabric 108. Boot configuration database 204 also contains bootstrap program 308 that initiates the dynamic booting of servers 102 in data center 200.

Figure 4:
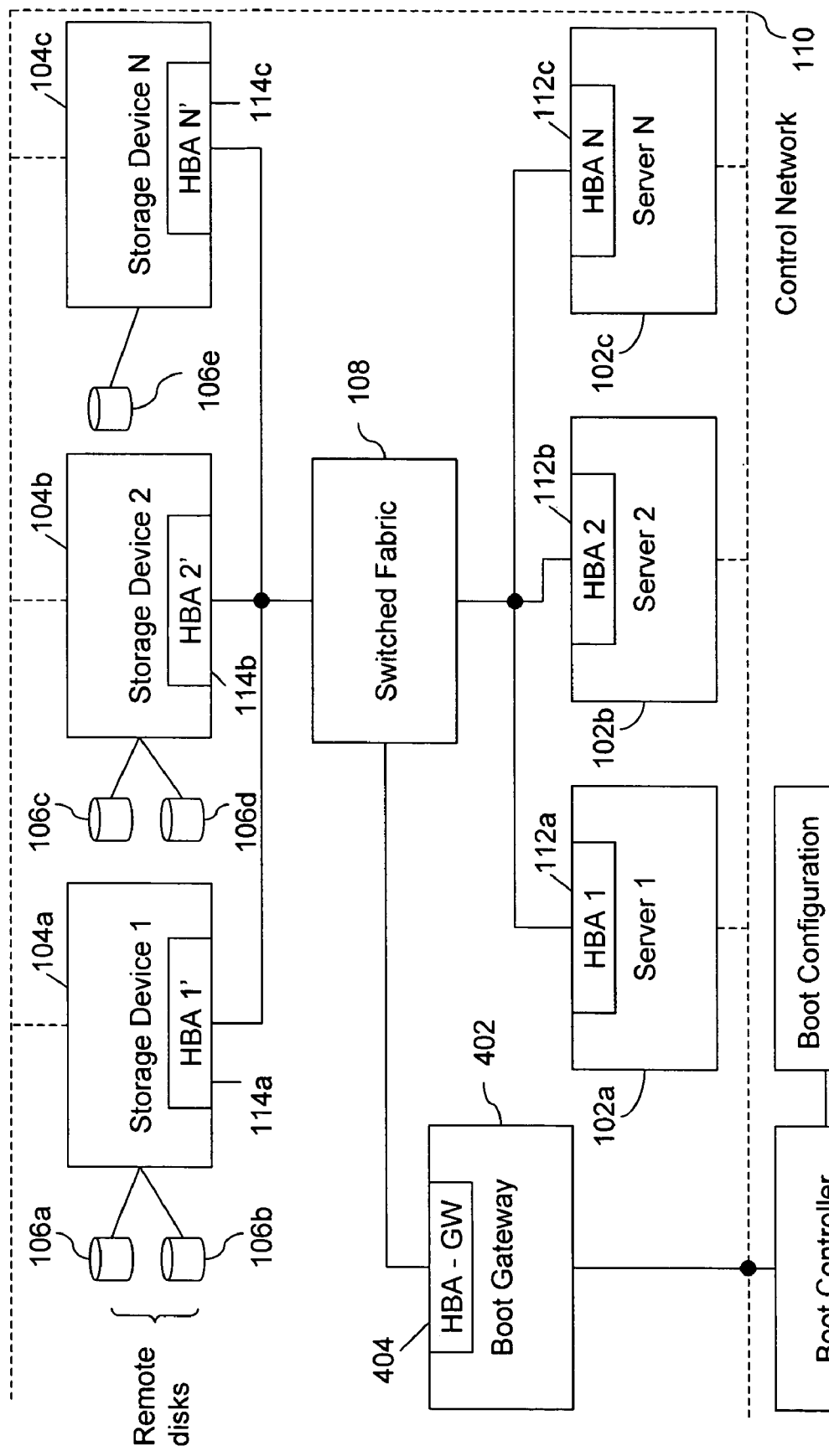
FIG. 4 is a block diagram illustrating the data center, in accordance with another embodiment of the invention.

FIG. 4 is a block diagram illustrating a data center 200, in accordance with another embodiment of the invention. In addition to the elements described in conjunction with FIG. 3, data center 200 includes boot gateway 402. Boot gateway 402 is connected to remote disk 106 through a Host Bust Adapter (HBA-GW) 404 and is also connected to control network 110.

Boot controller 202 assigns boot gateway 402 to facilitate booting of a set of servers 102. Further, boot controller 202 assigns a virtual WWN to remote disk 106, the virtual WWN uniquely identifying boot gateway 402, independent of its physical identity. In an embodiment of the invention, the assignment of the virtual WWN to remote disk 106 may be performed statically by a data center administrator.

In another embodiment of the invention, the assignment of the virtual WWN to remote disk 106 may be performed dynamically by boot controller 202. Subsequently, boot controller 202 communicates the mapping to storage device 104 over control network 110. This authorizes boot gateway 402 to access remote disk 106.

The virtual WWN assigned to boot gateway 402 may either be performed statically by the data center administrator or dynamically by boot controller 202. The virtual WWN assigned to boot gateway 402 is also configured in switched fabric 108. This authorizes boot gateway 402 to login to switched fabric 108. Boot gateway 402 communicates with servers 102 over control network 110 and eliminates the need for changes made to the Basic Input Output System (BIOS) code, accomplishing staged booting of servers 102.

In various embodiments of the invention, multiple boot gateways 402 may be present in data center 200.

Figure 5:
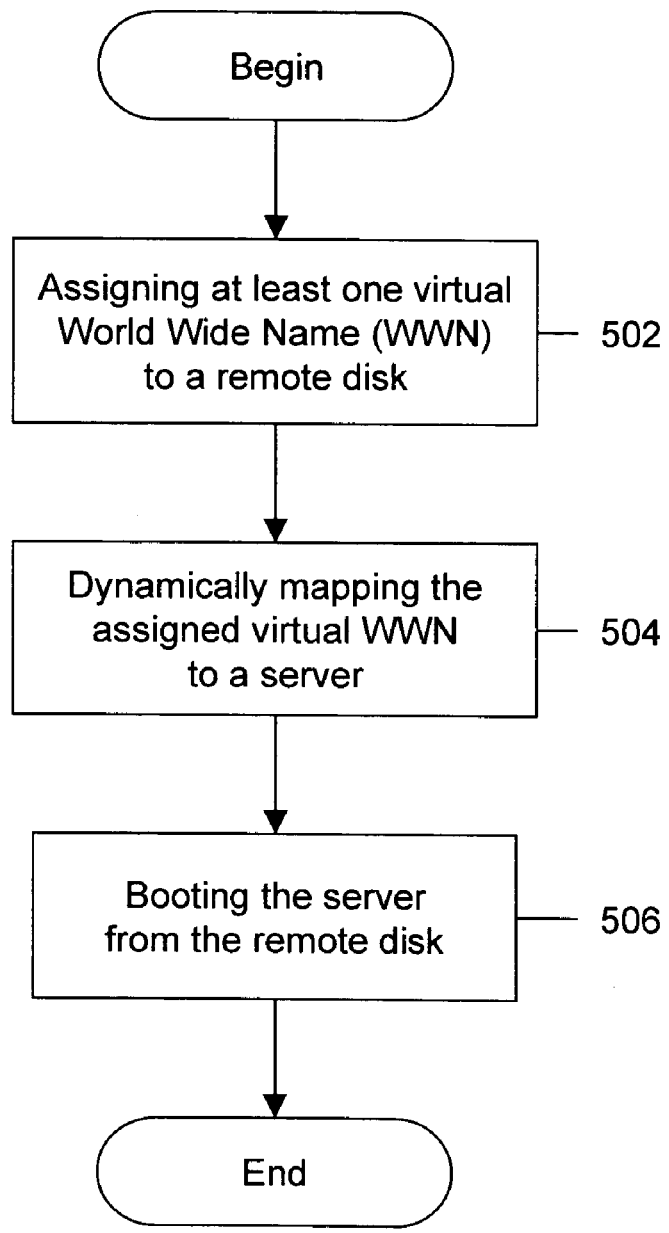
FIG. 5 is a flowchart illustrating a method for dynamically binding a server to a remote disk, in accordance with an embodiment of the invention.

FIG. 5 is a flowchart illustrating a method for dynamically binding server 102 to remote disk 106, in accordance with an embodiment of the invention. At step 502, one or more virtual WWNs are assigned to remote disk 106. In various embodiments of the invention, the assignment of virtual WWNs to remote disk 106 may be performed by one of the data center administrator or boot controller 202.

At step 504, boot controller 202 dynamically maps one of the one or more virtual WWNs to server 102.

In data center 200, when server 102 is powered on, its firmware broadcasts a request for booting through an Ethernet NIC on control network 110. Server 102 subsequently goes into an idle state. Boot controller 202 accepts the request of server 102 and provides the complete path of bootstrap program 308 to the firmware of server 102. Subsequently, the firmware of server 102 downloads and runs bootstrap program 308.

Server 102 and boot controller 202 communicate over control network 110 by using standard protocol suites. For example, Pre-execution Environment (PXE) is a standard environment to bootstrap computers by using NICs, which are a combination of Dynamic Host configuration Protocol (DHCP) and Trivial File Transfer Protocol (TFTP). Server 102 may broadcast a request for booting by using the DHCP protocol and download bootstrap program 308, using the TFTP protocol.

Bootstrap program 308 facilitates communication between boot controller 202 and server 102 over control network 110. Boot controller 202 selects the server image from which server 102 is required to boot. This decision may be made based on the functional requirements of data center 200. Further, the hardware capabilities of server 102 may be examined, corresponding to the server image to be booted. Subsequently, boot controller 202 identifies remote disk 106, on which the desired server image is located, and communicates this information to server 102. At step 506, server 102 boots from remote disk 106 over switched fabric 108.

Figure 6:
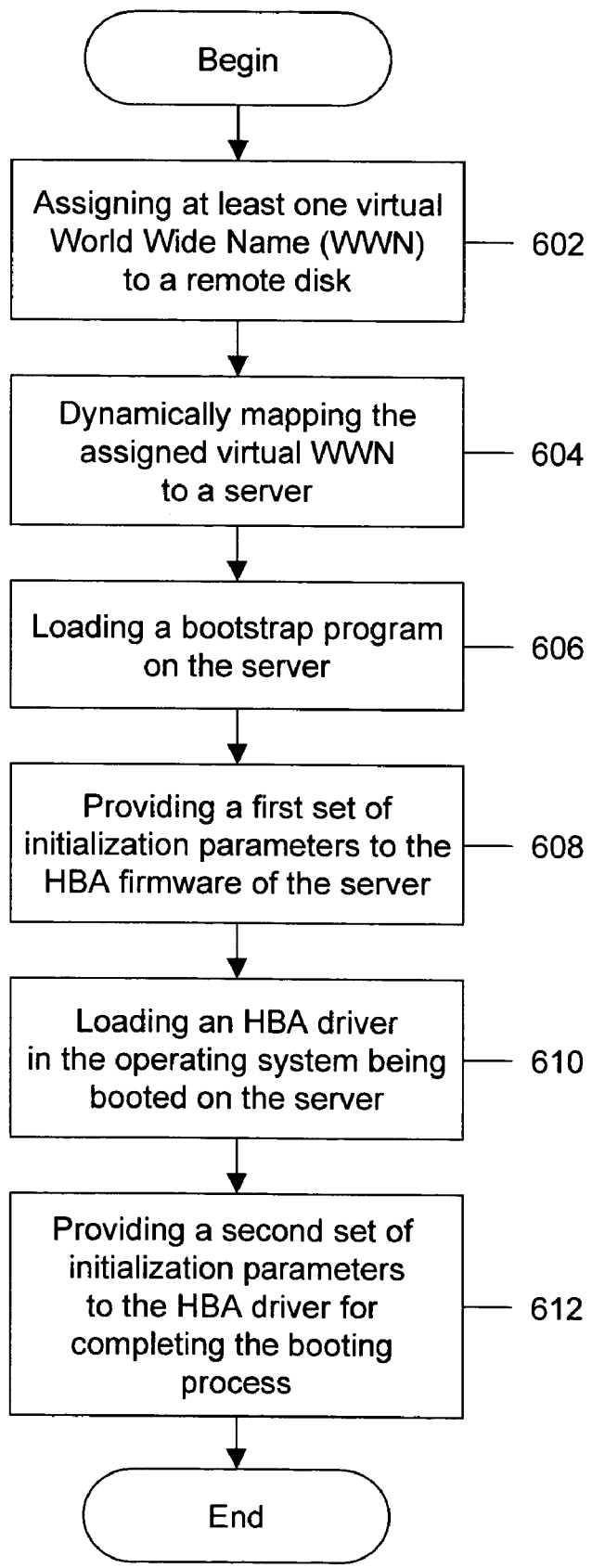
FIG. 6 is a flowchart illustrating a method for dynamically binding a server to a remote disk, in accordance with another embodiment of the invention.

FIG. 6 is a flowchart illustrating a method for dynamically binding server 102 to remote disk 106, in accordance with another embodiment of the invention. At step 602, one or more virtual WWNs are assigned to remote disk 106. In various embodiments of the invention, the assignment of virtual WWNs to remote disk 106 may be performed by one of the data center administrator or boot controller 202. Boot controller 202 updates remote disk-to virtual WWN mapping 302, stored in boot configuration database 204. Subsequently, boot controller 202 selects a server image and identifies remote disk 106, on which the desired server image is located. Boot controller 202 also examines the hardware capabilities of server 102.

At step 604, boot controller 202 dynamically maps one of the one or more virtual WWNs assigned to remote disk 106 to server 102. Boot controller 202 dynamically updates server-to-remote disk mapping 304.

At step 606, boot controller 202 loads bootstrap program 308 on server 102. Bootstrap program 308 facilitates communication between boot controller 202 and server 102 over control network 110. Boot controller 202 communicates server-to-remote disk mapping 304 to server 102.

At step 608, bootstrap program 308 non-persistently passes a first set of initialization parameters to the firmware of HBA 112, installed on server 102. This initializes the HBA BIOS. Virtual WWN mapped to server 102 at step 604 is passed to the firmware of HBA 112. This information is stored non-persistently on server 102. Thereafter, HBA 112 logs in to switched fabric 108 and initiates a request to storage device 104 to access remote disk 106, according to the SCSI command set. Storage device 104 performs authenticity checks on server 102, based on the virtual WWN mapped to server 102 and the remote disk-to-virtual WWN mapping 302. Subsequently, storage device 104 responds to the request made by server 102, in accordance with the SCSI command set.

Further, at step 610, an HBA driver is loaded in the operating system being booted on server 102. At step 612, bootstrap program 308 non-persistently passes a second set of initialization parameters to the HBA driver. The Virtual WWN mapped to server 102 at step 604 is passed to the HBA driver. The virtual WWN information is stored in the HBA driver-specific registry keys. This information is stored non-persistently on server 102. The HBA driver, once loaded and initialized, carries out the complete booting of server 102 over remote disk 106.

Figure 7:
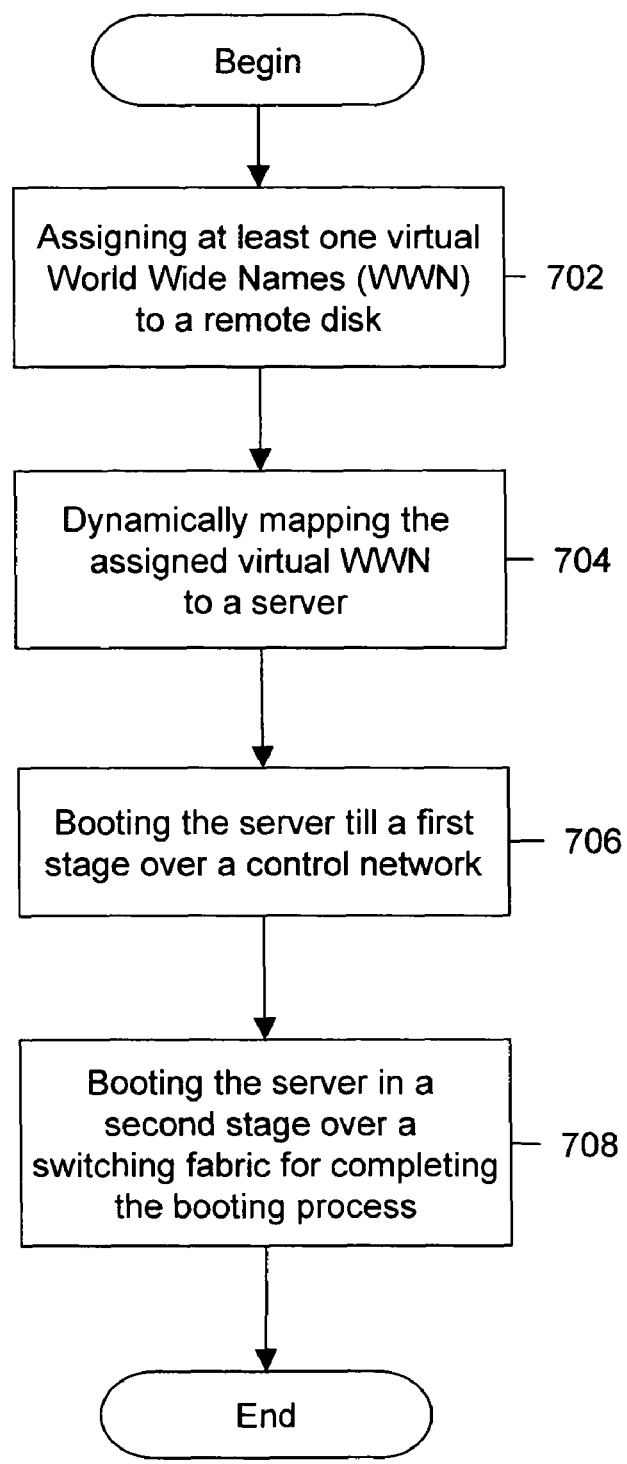
FIG. 7 is a flowchart illustrating a method for dynamically binding a server to a remote disk, in accordance with still another embodiment of the invention.

FIG. 7 is a flowchart illustrating a method for dynamically binding server 102 to remote disk 106, in accordance with yet another embodiment of the invention. At step 702, at least one virtual WWN is assigned to remote disk 106. In various embodiments of the invention, the assignment of virtual WWNs to remote disk 106 may be performed by one of the data center administrator or boot controller 202.

At step 704, boot controller 202 dynamically maps the assigned virtual WWN to server 102. This authorizes server 102 to access remote disk 106 over switched fabric 108.

At step 706, boot gateway 402 executes the first stage of booting server 102 over control network 110.

At step 708, the second stage of booting server 102 occurs over switched fabric 108.

Figure 8A:
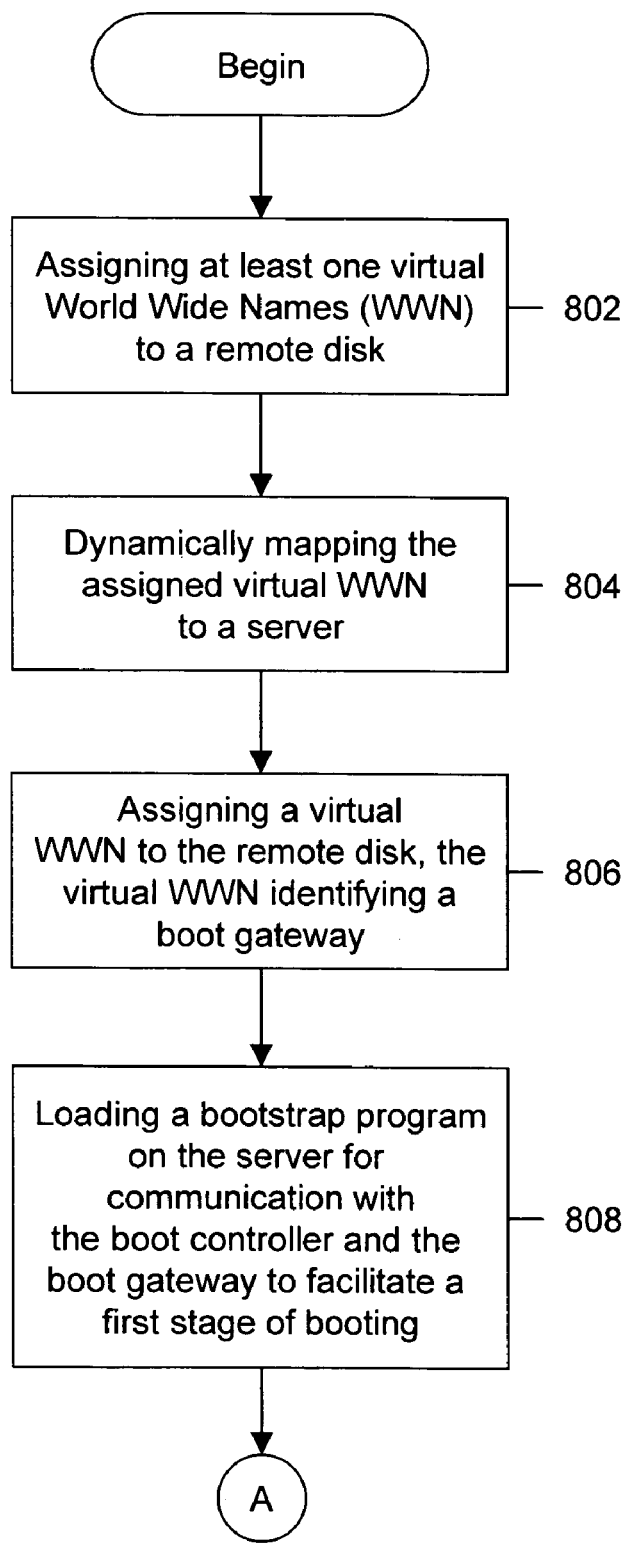
FIGS. 8A and 8B represent a flowchart illustrating a method for dynamically binding a server to a remote disk, in accordance with yet another embodiment of the invention.
Figure 8B:
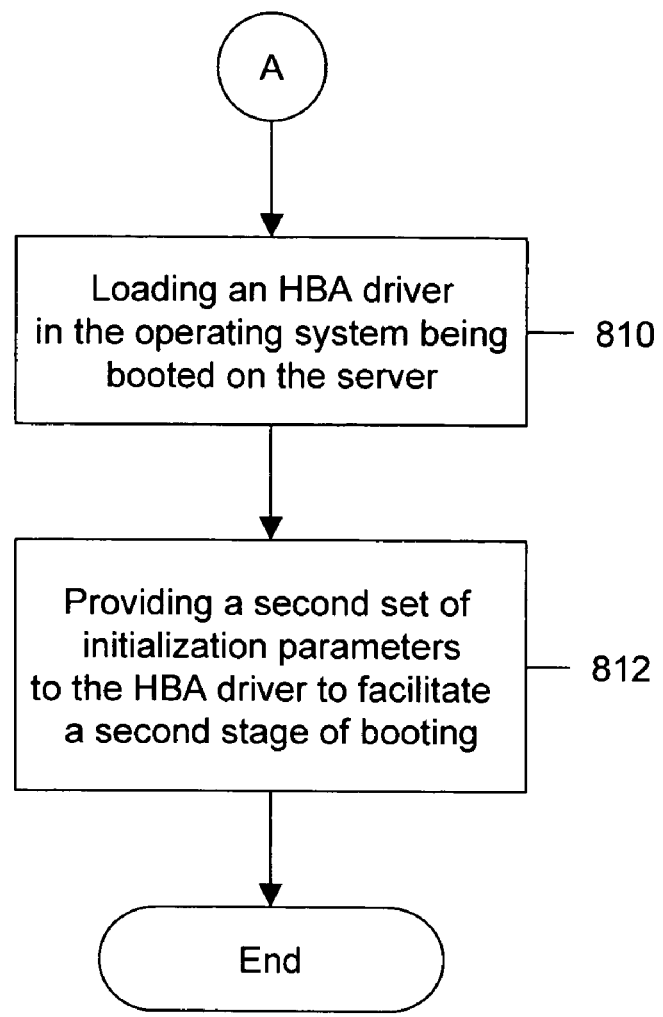

FIGS. 8A and 8B represent a flowchart illustrating a method for dynamically binding server 102 to remote disk 106, in accordance with still another embodiment of the invention. At step 802, at least one virtual WWN is assigned to remote disk 106. In various embodiments of the invention, the assignment of virtual WWNs to remote disk 106 may be performed by one of the data center administrator or boot controller 202.

At step 804, boot controller 202 dynamically maps the assigned at least one virtual WWN to server 102. At step 806, a virtual WWN is also assigned to remote disk 106. The virtual WWN assigned to remote disk 106 at step 806 identifies boot gateway 402, independent of its physical identity. Further, the mapping of the virtual WWN to HBA-GW 404 of boot gateway 402 may either be performed statically by the data center administrator or dynamically by the boot controller. This authorizes boot gateway 402 to access remote disk 106 over switched fabric 108.

At step 808, boot controller 202 loads bootstrap program 308 on server 102 to facilitate the first stage of booting server 102. Bootstrap program 308 facilitates the process of server 102 communicating with boot controller 202 and boot gateway 402 over control network 110.

Bootstrap program 308 loads a protocol stack on server 102 by using a set of standard protocols. Subsequently, the driver of the protocol stack loaded on server 102, initiates the first stage of booting server 102 by making a request for read/write operations. The driver communicates with boot gateway 402 over control network 110, in accordance with the protocol command set. Boot gateway 402 logs in to switched fabric 108 by using the virtual WWN mapped onto HBA-GW 404, and accesses remote disk 106. Boot gateway 402 responds to the driver, in accordance with the protocol command set, and completes the first stage of booting server 102 over control network 110.

Bootstrap program 308 may load an iSCSI protocol stack on server 102 by using the PXE protocol, and the iSCSI driver may carry out the first stage of booting server 102 over control network 110.

Subsequently, at step 810, boot gateway 402 loads an HBA driver in the operating system being booted on server 102. At step 812, bootstrap program 308 non-persistently passes a second set of initialization parameters to the HBA driver. At least the one virtual WWN mapped to server 102 is passed to the HBA driver at step 804. Information pertaining to at least the one virtual WWN mapped to server 102 is inserted in the HBA driver-specific registry keys. This information is stored non-persistently on server 102. The HBA driver, once loaded and initialized, carries out the second stage of booting server 102 over remote disk 106.

The invention eliminates the need for persistent mappings and configurations to boot the server from the remote disk. The invention facilitates communication with servers in a data center when no operating system is running on the servers. Moreover, the invention helps in decoupling the software environment and the configurations from the hardware of the server. Further, the invention facilitates the implementation of server repurposing in a data center. Therefore, the invention provides the process of booting servers without any change in the server firmware.

The system for managing requests for a resource in a computer network, as described in the invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the invention.

The computer system comprises a computer, an input device, a display unit, and the Internet. The computer also comprises a microprocessor, which is connected to a communication bus. Moreover, the computer includes a memory, which may include Random Access Memory (RAM) and Read Only Memory (ROM). Further, the computer system comprises a storage device, which can be a hard disk drive or a removable storage drive such as a floppy disk drive, an optical disk drive, etc. The storage device can also be other similar means for loading computer programs or other instructions into the computer system. Moreover, the computer system includes a communication unit, which enables the computer to connect to other databases and the Internet through an I/O interface, and facilitates the transfer and reception of data from other databases. The communication unit may include a modem, an Ethernet card, or any similar device, which enables the computer system to connect to databases and networks such as LAN, MAN, WAN and the Internet. The computer system facilitates inputs from a user through an input device that is accessible to the system through an I/O interface.

The computer system executes a set of instructions that are stored in one or more storage elements, to process input data. The storage elements may also contain data or other information, as desired. These storage elements may be in the form of an information source or a physical memory element present in the processing machine.

The set of instructions may include various commands that instruct the processing machine to perform specific tasks such as the steps that constitute the method of the invention. The set of instructions may be in the form of a software program. The software may be in the form of a collection of separate programs, a program module with a larger program, or a portion of a program module, as in the invention. The software may also include modular programming in the form of object-oriented programming. Processing of input data by the processing machine may be in response to user commands, results of previous processing, or a request made by another processing machine. The instructions may be provided on any suitable computer readable media.

While various embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for remote booting of at least one server from at least one of a plurality of remote disks in a data center, the at least one server being connected to a Fibre Channel Switched Fabric (FC-SW) through at least one host bus adapter (HBA), the HBA being assigned a fixed, physical World Wide Name (WWN), the at least one of the plurality of remote disks being managed by at least one storage device, the at least one storage device and the at least one server in the data center are physical devices communicating over the Fibre Channel Switched Fabric, the at least one server, the at least one storage device and the Fibre Channel Switched Fabric constituting a Storage Area Network (SAN), the data center comprising at least one boot controller, the at least one boot controller being connected to the at least one server through a control network, the method comprising the steps of:

a. dynamically selecting a server image, based on the requirements of the data center, the server image being selected for remote booting of the at least one server, the server image being located on the at least one of the plurality of remote disks, the server image being associated with a Virtual World Wide Name (WWN), the Virtual WWN being independent of the physical WWN of any server in the SAN, wherein the Virtual WWN being used by the server to establish communications on the FC-SW constitutes the SAN for the duration of time the selected server image is operated on the server;

b. dynamically assigning the at least one virtual World Wide Name (WWN) to the at least one of the plurality of remote disks connected to the Fibre Channel Switched Fabric on the SAN, the at least one virtual WWN assigned to the at least one of the plurality of remote disks being independent and mutually exclusive of a physical identity of the at least one of the plurality of remote disks;

c. dynamically mapping the assigned virtual WWN to the at least one server, the at least one server connected to the Fibre Channel Switched Fabric on the SAN, the dynamic mapping authorizing the at least one server to access the at least one of the plurality of remote disks to boot the at least one server, the at least one virtual WWN mapped onto the at least one server being independent and mutually exclusive of a physical WWN of the at least one server; and d. remotely booting the at least one server from the selected server image by using the at least one virtual WWN, the at least one virtual WWN representing a virtual identity to uniquely identify the physical devices present on the SAN, wherein the at least one boot controller facilitates dynamic, non-persistent binding between the at least one server and the at least one of plurality of the remote disks by using the at least one virtual WWN, for remote booting of the at least one server.

2. The method according to claim 1, wherein booting the at least one server comprises loading a bootstrap program on the at least one server, wherein the bootstrap program facilitates communication between the at least one server and the at least one boot controller over the control network.

3. The method according to claim 2, wherein the at least one HBA includes firmware and the method further includes the step of providing a first set of initialization parameters to the firmware of the at least one HBA, the first set of initialization parameters providing the at least one server access to the at least one of the plurality of remote disks over the Fibre Channel Switched Fabric.

4. The method according to claim 3, wherein the first set of initialization parameters is provided non-persistently.

5. The method according to claim 3 further comprising the step of loading an HBA driver in an operating system booting on the at least one server.

6. The method according to claim 5 further comprising providing a second set of initialization parameters to the HBA driver in the operating system booting on the at least one server, the second set of initialization parameters facilitating further communication between the at least one server and the at least one of the plurality of remote disks over the Fibre Channel Switched Fabric.

7. The method according to claim 6, wherein the second set of initialization parameters is provided non-persistently.

8. The method according to claim 1 further comprising the step of maintaining a server-to-remote disk mapping, the server-to-remote disk mapping facilitating one-to-one association between the at least one server and the at least one of the plurality of remote disks.

9. The method according to claim 1 further comprising the step of maintaining a remote disk-to-virtual WWN mapping, the remote disk-to-virtual WWN mapping facilitating authorizing the at least one server to access the at least one of the plurality of remote disks.

10. The method according to claim 1 further comprising the step of configuring the remote disk-to-virtual WWN mapping in the Fibre Channel Switched Fabric, wherein the remote disk-to-virtual mapping facilitates dynamic assignment of the at least one Virtual WWN to the at least one of the plurality of remote disks.

11. The method according to claim 1, wherein the control network further provides communication between the at least one boot controller and the at least one storage device, the at least one storage device managing the at least one of the plurality of remote disks.

12. The method according to claim 1, wherein the server image comprises an operating system, a set of drivers specific to the operating system, the operating system configuration data, and the application software.

13. A method for remote booting of at least one server from at least one of a plurality of remote disks in a data center, the at least one server being connected to a Fibre Channel Switched Fabric (FC-SW) through at least one host bus adapter (HBA), the HBA being assigned a fixed, physical World Wide Name (WWN), the at least one of the plurality of remote disks being managed by at least one storage device, the at least one storage device and the at least one server in the data center are physical devices communicating over the Fibre Channel Switched Fabric, the at least one server, the at least one storage device and the Fibre Channel Switched Fabric constituting a Storage Area Network (SAN), the data center comprising at least one boot controller, the at least one boot controller being connected to the at least one server through a control network, the data center further comprising at least one boot gateway, the at least one boot gateway being connected to the Fibre Channel Switched Fabric through at least one boot gateway host bus adapter (HBA-GW), the at least one boot gateway further being connected to the control network and constituting a part of the SAN, the method comprising the steps of:
  a. dynamically selecting a server image, based on the requirements of the data center, the server image being selected for remote booting of the at least one server, the server image being located on the at least one of the plurality of remote disks, the server image being associated with a Virtual World Wide Name (WWN), the Virtual WWN being independent of the physical WWN of any server in the SAN, wherein the Virtual WWN being used by the server to establish communications on the FC-SW constitutes the SAN for the duration of time the selected server image is operated on the server;
  b. dynamically assigning the at least one virtual World Wide Name (WWN) to the at least one of the plurality of remote disks connected to the Fibre Channel Switched Fabric on the SAN, the at least one virtual WWN assigned to the at least one of the plurality of remote disks being independent and mutually exclusive of a physical identity of the at least one of the plurality of remote disks;
  c. dynamically mapping the assigned virtual WWN to the at least one server, the dynamic mapping authorizing the at least one server to access the at least one of the plurality of remote disks to boot the at least one server, the at least one server connected to the Fibre Channel Switched Fabric on the SAN, the at least one virtual WWN mapped onto the at least one server, being independent and mutually exclusive of a physical WWN of the at least one server;
  d. remotely booting the at least one server from the selected server image, the at least one server being booted until a first stage over the control network through the at least one boot gateway, the at least one boot gateway accessing the at least one of the plurality of remote disks over the Fibre Channel Switched Fabric; and
  e. booting the at least one server until a second stage, the at least one server being booted until the second stage over the Fibre Channel Switched Fabric by using the at least one virtual WWN, the at least one virtual WWN representing a virtual identity to uniquely identify the physical devices present on the SAN, the at least one server accessing the at least one of the plurality of remote disks over the Fibre Channel Switched Fabric,
  wherein the at least one boot controller facilitates dynamic, non-persistent binding between the at least one server and the at least one of plurality of the remote disks by using the at least one virtual WWN, for remote booting of the at least one server.

14. The method according to claim 13, wherein the step of booting the at least one server until the first stage further comprises loading a bootstrap program on the at least one server.

15. The method according to claim 14, wherein the bootstrap program facilitates communication between the at least one server and the at least one boot controller over the control network.

16. The method according to claim 14, wherein the bootstrap program further facilitates communication between the at least one server and the one of the at least one boot gateway over the control network.

17. The method according to claim 14, wherein the step of booting the at least one server until the first stage further comprises loading an HBA driver in an operating system booting on the at least one server, the step of booting the at least one server further comprising providing a first set of initialization parameters required for establishing a communication between the at least one server and the at least one boot gateway, the first set of initialization parameters providing the at least one server access to the at least one of the plurality of remote disks, the first set of initialization parameters being provided non-persistently.

18. The method according to claim 14 further comprising the step of providing a second set of initialization parameters to the HBA driver in the operating system booting on the at least one server, the second set of initialization parameters facilitating the second stage of booting of the at least one server, whereby the at least one server communicates with the at least one of the plurality of remote disks over the Fibre Channel Switched Fabric.

19. The method according to claim 18, wherein the second set of initialization parameters is non-persistent.

20. The method according to claim 13 further comprising the step of maintaining a server-to-remote disk mapping, wherein the server-to-remote disk mapping facilitates one-to-one association between the at least one server and the at least one of the plurality of remote disks.

21. The method according to claim 13 further comprising the step of maintaining a remote disk-to-virtual WWN mapping, wherein the remote disk-to-virtual WWN mapping facilitates authorizing the at least one server and the one of the at least one boot gateway to access the at least one of the plurality of remote disks.

22. The method according to claim 13 further comprising the step of configuring the remote disk-to-virtual WWN mapping in the Fibre Channel Switched Fabric, whereby the at least one server and the one of the at least one boot gateway are authorized to log in to the Fibre Channel Switched Fabric.

23. The method according to claim 13, wherein the server image comprises an operating system, a set of drivers specific to the operating system, the operating system configuration data, and the application software.

24. A system for remote booting of at least one server from at least one of a plurality of remote disks, the at least one server being connected to a Fibre Channel Switched Fabric (FC-SW) through at least one host bus adapter (HBA), the HBA being assigned a fixed, physical World Wide Name (WWN), the at least one of the plurality of remote disks being managed by at least one storage device, the at least one storage device and the at least one server in the data center are physical devices communicating over the Fibre Channel Switched Fabric, the at least one server, the at least one storage device and the Fibre Channel Switched Fabric constituting a Storage Area Network (SAN), the system comprising:

a. a boot configuration database, the boot configuration database storing a remote disk-to-virtual World Wide Name (WWN) mapping, the remote disk-to-virtual WWN mapping comprising information related to the assignment of at least one virtual WWN to the at least one of the plurality of remote disks, the at least one virtual WWN being assigned dynamically to the at least one of the plurality of remote disks connected to the Fibre Channel Switched Fabric on the SAN, the at least one virtual WWN assigned to the at least one of the plurality of remote disks being independent and mutually exclusive of a physical identity of the at least one of the plurality of remote disks;

b. at least one boot controller, the at least one boot controller performing:

dynamically selecting a server image, based on the requirements of the data center, the server image being selected for remote booting of the at least one server, the server image being located on the at least one of the plurality of remote disks, the server image being associated with a Virtual World Wide Name (WWN), the Virtual WWN being independent of the physical WWN of any server in the SAN, wherein the Virtual WWN being used by the server to establish communications on the FC-SW constitutes the SAN for the duration of time the selected server image is operated on the server;

dynamically mapping the assigned virtual WWN to the at least one server, the dynamic mapping authorizing the at least one server to access the at least one of the plurality of remote disks to boot the at least one server, the at least one server connected to the Fibre Channel Switched Fabric on the SAN, the at least one virtual WWN mapped onto the at least one server being independent and mutually exclusive of a physical WWN of the at least one server; and remotely booting the at least one server from the selected server image by using the at least one virtual WWN, the at least one virtual WWN representing a virtual identity to uniquely identify the physical devices present on the SAN, the at least one boot controller facilitating dynamic, non-persistent binding between the at least one server and the at least one of plurality of the remote disks by using the at least one virtual WWN, for remote booting of the at least one server; and c. a control network, the control network providing communication between the at least one boot controller, the at least one storage device and the at least one server.

25. The system according to claim 24, wherein the remote disk-to-virtual WWN mapping permits authorizing the at least one server to access the at least one of the plurality of remote disks, wherein the remote disk-to-virtual mapping facilitates dynamic assignment of the at least one Virtual WWN to the at least one of the plurality of remote disks.

26. The system according to claim 24, wherein the boot configuration database further comprises a server-to-remote disk mapping, the server-to-remote disk mapping comprising information related to the association between the at least one server and the at least one of the plurality of remote disks, the server-to-remote disk mapping being updated dynamically, the server-to-remote disk mapping facilitating one-to-one association between the at least one server and the at least one of the plurality of remote disks.

27. The system according to claim 24, wherein the boot configuration database further comprises a repository of at least one virtual WWN.

28. The system according to claim 24, wherein the boot configuration database further comprises a bootstrap program, the bootstrap program facilitating communication between the at least one server and the at least one boot controller over the control network.

29. The system according to claim 24, wherein the at least one boot controller loads the bootstrap program on the at least one server over the control network, the bootstrap program facilitating communication between the at least one server and the at least one boot controller over the control network.

30. The system according to claim 29, wherein the bootstrap program provides a first set of initialization parameters to a the firmware of the at least one HBA, the first set of initialization parameters providing the at least one server access to the at least one of the plurality of remote disks, the first set of initialization parameters being provided non-persistently.

31. The system according to claim 30, wherein the bootstrap program loads an HBA driver in an operating system booting on the at least one server.

32. The system according to claim 31, wherein the bootstrap program further provides a second set of initialization parameters to the HBA driver in an operating system booting on the at least one server, the second set of initialization parameters facilitating further communication between the at least one server and the at least one of the plurality of remote disks over the Fibre Channel Switched Fabric, the second set of initialization parameters being provided non-persistently.

33. The system according to claim 24, wherein the at least one boot controller dynamically updates a server-to-remote disk mapping stored in the boot configuration database, the server-to-remote disk mapping comprising information related to the association between the at least one server and the at least one of the plurality of remote disks.

34. The system according to claim 24, wherein the at least one boot controller updates the remote disk-to-virtual WWN mapping stored in the boot configuration database, the remote disk-to-virtual WWN mapping comprising information related to the assignment of at least one virtual WWN to the at least one of the plurality of remote disks.

35. The system according to claim 24, wherein the control network further provides communication between the at least one boot controller and the at least one storage device, the at least one storage device managing the at least one of the plurality of remote disks.

36. The system according to claim 24, wherein the Fibre Channel Switched Fabric is configured with the remote disk-to-virtual WWN mapping, wherein the remote disk-to-virtual mapping facilitates dynamic assignment of the at least one Virtual WWN to the at least one of the plurality of remote disks.

37. A system for remote booting at least one server from at least one of a plurality of remote disks, the at least one server being connected to a Fibre Channel Switched Fabric (FC-SW) through at least one host bus adapter (HBA), the HBA being assigned a fixed, physical World Wide Name (WWN), the at least one of the plurality of remote disks being managed by at least one storage device, the at least one storage device and the at least one server in the data center are physical devices communicating over the Fibre Channel Switched Fabric, the at least one server, the at least one storage device and the Fibre Channel Switched Fabric constituting a Storage Area Network (SAN), the system comprising:
 a. a boot configuration database, the boot configuration database storing a remote disk-to-virtual World Wide Name (WWN) mapping, the remote disk-to-virtual WWN mapping comprising information related to the assignment of at least one virtual WWN to the at least one of the plurality of remote disks, the remote disk-to-virtual WWN mapping being updated, the at least one virtual WWN being assigned dynamically to the at least one of the plurality of remote disks connected to the Fibre Channel Switched Fabric on the SAN, the at least one virtual WWN assigned to the at least one of the plurality of remote disks being independent and mutually exclusive of a physical identity of the at least one of the plurality of remote disks;
 b. at least one boot controller, the at least one boot controller performing:
  dynamically selecting a server image, based on the requirements of the data center, the server image being selected for remote booting of the at least one server, the server image being located on the at least one of the plurality of remote disks, the server image being associated with a Virtual World Wide Name (WWN), the Virtual WWN being independent of the physical WWN of any server in the SAN, wherein the Virtual WWN being used by the server to establish communications on the FC-SW constitutes the SAN for the duration of time the selected server image is operated on the server;
  dynamically mapping the assigned WWN to the at least one server, the dynamic mapping authorizing the at least one server to access the at least one of the plurality of remote disks to boot the at least one server, the at least one server connected to the Fibre Channel Switched Fabric on the SAN, the at least one virtual WWN mapped onto the at least one server being independent and mutually exclusive of a physical WWN of the at least one server; and
  remotely booting the at least one server from the selected server image by using the at least one virtual WWN, the at least one virtual WWN representing a virtual identity to uniquely identify the physical devices present on the SAN, the at least one boot controller facilitates dynamic, non-persistent binding between the at least one server and the at least one of plurality of the remote disks by using the at least one virtual WWN, for remote booting of the at least one server;
 c. at least one boot gateway, the at least one boot gateway facilitating a first stage of booting of the at least one server; and
 d. a control network, the control network providing communication between the at least one server, the at least one boot gateway, the at least one storage device, and the at least one boot controller.

38. The system according to claim 37, wherein the remote disk-to-virtual WWN mapping further comprises information related to the assignment of a virtual WWN to the at least one of the plurality of remote disks, the virtual WWN uniquely identifying one of the at least one boot gateway independent of a physical identity of the one of the at least one boot gateway.

39. The system according to claim 37, wherein the remote disk-to-virtual WWN mapping facilitates authorizing the at least one server and the one of the at least one boot gateway to access the at least one of the plurality of remote disks.

40. The system according to claim 37, wherein the boot configuration database further comprises a server-to-remote disk mapping, the server-to-remote disk mapping comprising information related to the association between the at least one server and the at least one of the plurality of remote disks, the server-to-remote disk mapping being updated dynamically.

41. The system according to claim 40, wherein the server-to-remote disk mapping facilitates one-to-one association between the at least one server and the at least one of the plurality of remote disks.

42. The system according to claim 37, wherein the boot configuration database further comprises a repository of a plurality of virtual WWNs.

43. The system according to claim 37, wherein the boot configuration database further comprises a bootstrap program, the bootstrap program facilitating communication between the at least one server and the at least one boot controller over the control network.

44. The system according to claim 37, wherein the at least one boot controller assigns the one of the at least one boot gateway to the at least one server.

45. The system according to claim 37, wherein the at least one boot controller initiates the first stage of booting of the at least one server, the boot controller loading a bootstrap program on the at least one server over the control network, the bootstrap program facilitating communication between the at least one server and the at least one boot controller over the control network.

46. The system according to claim 45, wherein the bootstrap program further facilitates communication between the at least one server and the one of at least one boot gateway over the control network.

47. The system according to claim 45, wherein the bootstrap program loads an HBA driver in the operating system booting on the at least one server over the control network through the one of the at least one boot gateway, the one of the at least one boot gateway accessing the remote disk over the Fibre Channel Switched Fabric.

48. The system according to claim 47, wherein the bootstrap program further provides a second set of initialization parameters to the HBA driver in the operating system booting on the at least one server, the second set of initialization parameters facilitating a second stage of booting of the at least one server, whereby the at least one server accesses the at least one of the plurality of remote disks over the Fibre Channel Switched Fabric, the second set of initialization parameters being provided non-persistently.

49. The system according to claim 37, wherein the at least one boot controller dynamically updates a server-to-remote disk mapping stored in the boot configuration database, the server-to-remote disk mapping comprising information related to the association between the at least one server and the at least one of the plurality of remote disk.

50. The system according to claim 37, wherein the at least one boot controller updates the remote disk-to-virtual WWN mapping stored in the boot configuration database, the remote disk-to-virtual WWN mapping comprising information related to the assignment of at least one virtual WWN to the at least one of the plurality of remote disks.

51. The system according to claim 37, wherein the control network further provides communication between the at least one boot controller and the at least one storage device, the at least one storage device managing the at least one of the plurality of remote disks.

52. The system according to claim 37, wherein the Fibre Channel Switched Fabric is configured with the remote disk-to-virtual WWN mapping, whereby the at least one server and the one of the at least one boot gateway are authorized to log in to the Fibre Channel Switched Fabric.

53. A computer program product, disposed on a computer non-transitory computer readable storage medium, for remote booting at least one server from at least one of a plurality of remote disks in a data center, the at least one server being connected to a Fibre Channel Switched Fabric (FC-SW) through at least one host bus adapter (HBA), the HBA being assigned a fixed, physical World Wide Name (WWN), the at least one of the plurality of remote disks being managed by at least one storage device, the at least one storage device and the at least one server in the data center are physical devices communicating over the Fibre Channel Switched Fabric, the at least one server, the at least one storage device and the Fibre Channel Switched Fabric constituting a Storage Area Network (SAN), the data center comprising at least one boot controller, the at least one boot controller being connected to the at least one server through a control network, the computer program product comprising:
    a. a program instruction means for dynamically selecting a server image, based on the requirements of the data center, the server image being selected for remote booting of the at least one server, the server image being located on the at least one of the plurality of remote disks, the server image being associated with a Virtual World Wide Name (WWN), the Virtual WWN being independent of the physical WWN of any server in the SAN, wherein the Virtual WWN being used by the server to establish communications on the FC-SW constitutes the SAN for the duration of time the selected server image is operated on the server;
    b. a program instruction means for dynamically assigning the at least one virtual World Wide Name (WWN) to the at least one of the plurality of remote disks connected to the Fibre Channel Switched Fabric on the SAN, the at least one virtual WWN assigned to the at least one of the plurality of remote disks being independent and mutually exclusive of a physical identity of the at least one of the plurality of remote disks;
    c. a program instruction means for dynamically mapping the assigned virtual WWN to the at least one server, the dynamic mapping authorizing the at least one server to access the at least one of the plurality of remote disks to boot the at least one server, the at least one server connected to the Fibre Channel Switched Fabric on the SAN, the at least one virtual WWN mapped onto the at least one server being independent and mutually exclusive of a physical identity WWN of the at least one server; and
    d. a program instruction means for remotely booting the at least one server from the selected server image by using the at least one virtual WWN, the at least one virtual WWN representing a virtual identity to uniquely identify the physical devices present on the SAN, wherein the at least one boot controller facilitates dynamic, non-persistent binding between the at least one server and the at least one of plurality of the remote disks by using the at least one virtual WWN, for remote booting of the at least one server.

54. The computer program product according to claim 53 further comprising program instruction means for providing a first set of initialization parameters to the firmware of the at least one HBA, the first set of initialization parameters providing the at least one server access to the at least one of the plurality of remote disks.

55. The computer program product according to claim 54 further comprising program instruction means for providing a second set of initialization parameters to an HBA driver in the operating system booting on the at least one server, the second set of initialization parameters facilitating further communication between the at least one server and the at least one of the plurality of remote disks over the Fibre Channel Switched Fabric.

56. A computer program product, disposed on a computer non-transitory computer readable storage medium, for remote booting at least one server from at least one of a plurality of remote disks in a data center, the at least one server being connected to a Fibre Channel Switched Fabric (FC-SW) through at least one host bus adapter (HBA), the HBA being assigned a fixed, physical World Wide Name (WWN), the at least one of the plurality of remote disks being managed by at least one storage device, the at least one storage device and the at least one server in the data center are physical devices communicating over the Fibre Channel Switched Fabric, the at least one server, the at least one storage device and the Fibre Channel Switched Fabric constituting a Storage Area Network (SAN), the data center comprising at least one boot controller, the at least one boot controller being connected to the at least one server through a control network, the data center further comprising at least one boot gateway, the at least one boot gateway being connected to the Fibre Channel Switched Fabric through at least one boot gateway host bus adapter (H BA-GW), the at least one boot gateway further being connected to the control network, the computer program product comprising:
    a. a program instruction means for dynamically selecting a server image, based on the requirements of the data center, the server image being selected for remote booting of the at least one server, the server image being located on the at least one of the plurality of remote disks, the server image being associated with a Virtual World Wide Name (WWN), the Virtual WWN being independent of the physical WWN of any server in the SAN, wherein the Virtual WWN being used by the server to establish communications on the FC-SW constitutes the SAN for the duration of time the selected server image is operated on the server;
    b. a program instruction means for dynamically assigning the at least one virtual World Wide Names (WWN) to the at least one of the plurality of remote disks connected to the Fibre Channel Switched Fabric on the SAN, the at least one virtual WWN assigned to the at least one of the plurality of remote disks being independent and mutually exclusive of a physical identity of the at least one of the plurality of remote disks;

c. a program instruction means for dynamically mapping the assigned virtual WWN to the at least one server, the at least one server connected to the Fibre Channel Switched Fabric on the SAN, the dynamic mapping authorizing the at least one server to access the at least one of the plurality of remote disks to boot the at least one server, the at least one virtual WWN mapped onto the at least one server being independent and mutually exclusive of a physical identity WWN of the at least one server;

d. a program instruction means for remotely booting the at least one server using the selected server image by using the at least one virtual WWN, the at least one virtual WWN representing a virtual identity to uniquely identify the physical devices present on the SAN, the at least one server being booted until a first stage over the control network through the at least one boot gateway, the at least one boot gateway accessing the at least one of the plurality of remote disks over the Fibre Channel Switched Fabric; and e. a program instruction means for booting the at least one server until a second stage, the at least one server being booted until the second stage over the Fibre Channel Switched Fabric, the at least one server accessing the at least one of the plurality of remote disks over the Fibre Channel Switched Fabric wherein the at least one boot controller facilitates dynamic, non-persistent binding between the at least one server and the at least one of plurality of the remote disks by using the at least one virtual WWN, for remote booting of the at least one server.

57. The computer program product according to claim 56 further comprising program instruction means for providing a first set of initialization parameters to the firmware of the at least one HBA, the first set of initialization parameters providing the at least one server access to the at least one of the plurality of remote disks.

58. The computer program product according to claim 57 further comprising program instruction means for providing a second set of initialization parameters to an HBA driver in the operating system booting on the at least one server, the second set of initialization parameters facilitating further communication between the at least one server and the at least one of the plurality of remote disks over the Fibre Channel Switched Fabric.

* * * * *